United States Patent [19]

Ona et al.

[11] Patent Number: 4,756,596
[45] Date of Patent: Jul. 12, 1988

[54] OPTICAL UNIT FOR COMPOSITE OVERHEAD GROUND WIRE

[75] Inventors: Atsuhiro Ona; Takeshi Yamamoto; Mahito Ishikawa, all of Kanagawa, Japan

[73] Assignee: Sumitomo Electric Industries, Ltd., Osaka, Japan

[21] Appl. No.: 918,257

[22] Filed: Oct. 14, 1986

[30] Foreign Application Priority Data

Oct. 26, 1985 [JP] Japan .................. 60-164900[U]

[51] Int. Cl.$^4$ .................................. G02B 6/44
[52] U.S. Cl. ........................................ 350/96.23
[58] Field of Search ............................ 350/96.23

[56] References Cited

U.S. PATENT DOCUMENTS 4,388,800  6/1983  Trezequet et al. .......... 350/96.23 X
4,389,088  1/1983  Trezequet .................. 350/96.23
4,541,686  9/1985  Barfuss et al. ............. 350/96.23

FOREIGN PATENT DOCUMENTS 0036949  3/1979  Japan ........................ 350/96.23

OTHER PUBLICATIONS

Nakahara et al, "Optical Fibers and Cable Engineering"; Optical Society of America; Extended Summary Paper #WB2; Jan. 1975; *Opt. Fiber Transmission Conf.*; 4 pages.

*Primary Examiner*—John Lee
*Assistant Examiner*—John Ngo
*Attorney, Agent, or Firm*—Cushman, Darby & Cushman

[57] ABSTRACT

An optical unit, particularly for use with a composite overhead conductor. The cylindrical, aluminum core of the optical unit has spirally shaped grooves on its surface into which optical fibers are placed. A tape is spirally wound to hold the optical fibers in the grooves. The winding pitch is such that the tape edges overlap. An aluminum pipe encases the spacer, optical fibers and tape. The tape consists of a thermally insulating middle layer and two sheets of aluminum foil sandwiching the middle layer, the aluminum foil contacting the pipe and the core so as to conduct electricity therebetween.

10 Claims, 1 Drawing Sheet

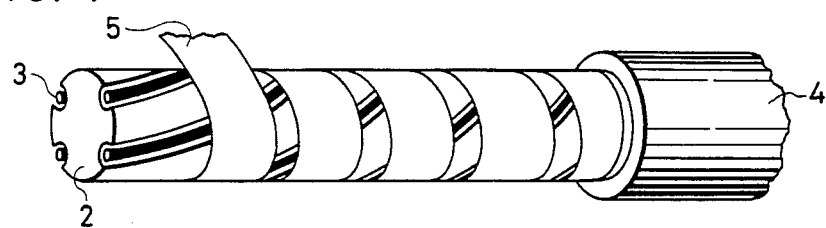
FIG. 1
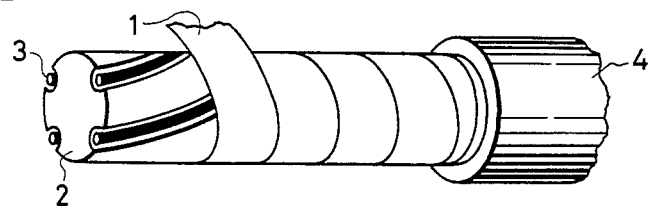
FIG. 2
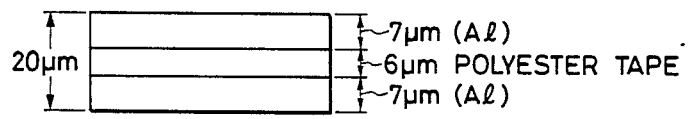
FIG. 3a
FIG. 3b
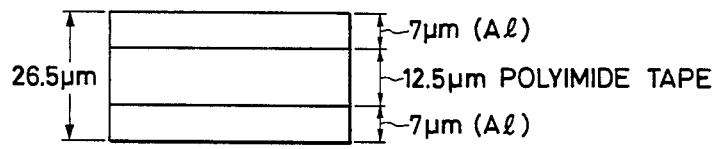
FIG. 4

OPTICAL UNIT FOR COMPOSITE OVERHEAD GROUND WIRE

BACKGROUND OF THE INVENTION

1. Field of the Invention

The present invention relates to a spacer-type composite overhead ground wire in which stranded metal wire is wound on an optical unit comprising a grooved aluminum spacer containing an optical fiber. More particularly, the invention relates to an optical unit for a composite overhead ground wire having an improved covering for holding down the optical fiber contained in the optical unit.

2. Background Art

FIG. 1 is a schematic structural drawing of a conventional optical unit for a spacer-type composite overhead ground wire. The optical unit contains an optical fiber 3 in each of the grooves of a grooved aluminum spacer 2. In order to prevent the optical fiber 3 contained in the groove of the spacer 2 from protruding therefrom, the process of making such an optical unit for a composite overhead ground wire includes fitting and packing the optical fiber 3 into the groove of spacer 2, winding an aluminum foil 5 less than 40 micrometers thick on the outer periphery of the grooved aluminum spacer 2 at a pitch of roughly 1/10, and encasing the spacer in an aluminum pipe 4.

The covering 5 wound on the optical unit for the composite overhead ground wire thus constructed must meet the following characteristics and requirements:

(1) electrical conduction between the grooved aluminum spacer 2 and the aluminum pipe 4;

(2) instantaneous heat resistance in the range of about 300° C.;

(3) thickness of about 40 micrometers or less to make the covering layer as thin as possible; and (4) tear-free properties during manufacture.

The aluminum foil conventionally used as the covering of an optical unit for a composite overhead ground wire of that type has properties characteristic of a weak foil. In particular, the presence of a scratch at an edge will readily develop into a tear. The problem is that during production the grooved spacer rubs against a guiding conduit or two grooved spacers rub against each other. This rubbing readily results in the breakdown of the edges of the aluminum foil. If the aluminum foil used as a covering is slightly torn, the aluminum pipe will be clogged with it in the next processing step in which the aluminum spacer is encased in the aluminum pipe. Thereby, defective cable will be produced.

SUMMARY OF THE INVENTION

In order to solve the above problems, the present invention is characterized in that a composite, heat-resistant insulation tape is overlappingly wound on the outer periphery of a grooved aluminum spacer containing an optical fiber in its groove. The composite insulation tape comprises an intermediate tape layer composed of reinforced, heat-resistant insulation material and two aluminum tapes, both of which are adhesion-bonded on opposite sides of the intermediate tape layer.

Since, according to the invention, the composite, heat-resistant insulation tape sandwiched between the aluminum tapes is thus overlappingly wound on the spacer, it is thermally insulating and provides electrical conduction between the grooved aluminum spacer and the aluminum pipe. At the same time, it prevents the initiation of a tear at the edges of the covering tape and thus reduces the production of defective units during manufacture.

BRIEF DESCRIPTION OF THE DRAWINGS

FIG. 1 is a schematic structural drawing of a conventional optical unit for a composite overhead ground wire.

FIG. 2 is a schematic structural drawing of an optical unit for a composite overhead ground wire embodying the present invention.

FIGS. 3a and 3b are sectional structural views of composite heat resistant insulation tapes respectively sandwiched in between aluminum tapes according to the present invention.

FIG. 4 is a diagram explanatory of electrical conduction across the aluminum pipe and the grooved aluminum spacer covered with the composite heat resistant insulation tape according to the present invention.

DETAILED DESCRIPTION OF THE PREFERRED EMBODIMENTS

FIG. 2 is a schematic structural drawing of an optical unit for a composite overhead ground wire embodying the present invention. A composite heat resistant insulation tape 1 comprises an intermediate tape layer composed of reinforced, heat-insulation material and two aluminum tape layers adhesion-bonded on both sides of the intermediate tape layer. The intermediate tape layer should have a melting point of 200° C. or higher. On the other hand, non-melting material, i.e., wood, is available for the intermediate tape layer. The composite tape 1 so formed is overlappingly wound on the outer periphery of a grooved aluminum spacer 2 containing an optical fiber 3 in its groove. The composite tape 1 is used as a covering for preventing the optical fiber 3 from protruding from the groove in the grooved spacer 2. Grooved spacer 2 and optical fiber 3 together with the composite tape 1 are encased then in an aluminum pipe 4.

FIGS. 3a and 3b are sectional structural drawings of first and second embodiments of composite, heat-resistant insulation tapes sandwiched between the aluminum tapes for use as a covering according to the present invention.

FIG. 3a shows the first embodiment in which a polyester tape about 6 micrometers thick is used as the intermediate layer prepared from heat-resistant insulation material, and it is sandwiched between aluminum tapes about 7 micrometers thick.

FIG. 3b shows the second embodiment in which a polyimide tape about 12.5 micrometers thick is used as the intermediate layer prepared from heat-resistant insulation material, and it also is sandwiched between aluminum tapes about 7 micrometers thick.

According to the first embodiment of FIG. 3a, the thickness of the overlapped portion of the composite polyester tape is set at 40 micrometers or thinner in view of the gap (clearance) between the aluminum pipe and the grooved aluminum spacer. To obtain a composite polyester tape of 20 micrometers thickness, the intermediate polyester layer is 6 micrometers thick, and each of the aluminum tapes is 7 micrometers thick. The overlapped portion is set at 1/5 to ½ of the tape width, thus assuring a thickness of no more than 40 micrometers.

According to the second embodiment of FIG. 3b, the thickness of the overlapped portion of the composite polyimide tape is set at 60 micrometers or less in consideration of the clearance between the aluminum pipe and the grooved spacer. To obtain a composite polyimide tape of 30 micrometers thickness with the aluminum tapes bonded on both sides of the polyimide layer, the thickness of the polyimide layer is set at 12.5 micrometers, and the thickness of each aluminum tape is set at 7 micrometers. This structure produces a total thickness of 26.5 micrometers. Just as in the first embodiment, the overlapped portion is set at 1/5 to ½ of the tape width.

Two optical units, each 3 km long, to be used for composite overhead ground wires, were made for trial purposes. The optical units were covered respectively with the polyester and polyimide tapes of the same constructions as those proposed according to the first and second embodiments. That is, either polyester or polyimide tape was sandwiched between the aluminum tapes. The results showed that the aluminum pipes were not clogged with torn and broken polyester or polyimide composite tape during the process of manufacture.

FIG. 4 illustrates electrical conduction between the aluminum pipe and the grooved aluminum spacer overlappingly covered with the composite, heat-resistant insulation tape sandwiched between the aluminum tapes. In other words, the current I is allowed to flow between the aluminum and the grooved aluminum spacer pipe 4 and first flows through the upper aluminum foil and then through the lower aluminum foil. The upper and lower foils each other contact at the overlap region.

Optical units for composite overhead ground wires 8 m long with the coverings respectively shown in FIGS. 3a and 3b were subjected to a short-circuit test at 5–10 kiloamps for 0.34 sec., and the test results proved not only sufficient electrical conduction between the aluminum pipe and the spacer, but also the heat resistance of the tapes. In other words, it was confirmed that the optical units thus constructed according to the present invention could be put to practical use without causing difficulty.

As set forth above, the composite, thermally insulating tape comprises an intermediate tape layer composed of reinforced, heat-resistant insulation material and two aluminum tapes respectively adhesion-bonded on both sides of the intermediate tape layer. The composite tape is overlappingly wound on the outer periphery of a grooved aluminum spacer containing an optical fiber in its groove. In consequence, the optical unit for the composite overhead ground wire is heat resistant. The composite tape provides electrical conduction between the grooved aluminum spacer and the aluminum pipe and simultaneously prevents the initiation of a tear in the edge portion of the covering tape. Thus, the number of manufactured defective units is reduced. Moreover, the manufacture of such optical units can effectively be made more routine.

What is claimed is:

1. An optical unit, comprising:
    a conductive cylindrical spacer having at least one axially extending groove formed in a peripheral surface;
    an optical fiber disposed in said groove;
    an overlapping tape, spirally wound on said spacer for covering said optical fiber and holding said optical fiber in said groove, said tape comprising a thermally insulating layer and two metallic layers sandwiching said thermally insulating layer; and
    a metallic pipe encasing and contacting said tape, said metallic layers of said tape enabling electrical conduction to occur between said conductive cylindrical spacer and said metallic pipe.

2. An optical unit as recited in claim 1, wherein each of said spacer, said metallic layers and said metallic pipe comprises aluminum.

3. An optical unit as recited in claim 2, wherein said tape overlaps in an overlapping region extending over 20% to 50% of a width of said tape.

4. An optical unit as recited in claim 1, wherein said tape overlaps in an overlapping region extending over 20% to 50% of a width of said tape.

5. An optical unit as recited in claim 1, wherein said thermally insulating layer comprises a material having a melting point of at least 200° C.

6. An optical unit as recited in claim 5, wherein said tape overlaps in an overlapping region extending over 20% to 50% of a width of said tape.

7. An optical unit as recited in claim 6, wherein said thermally insulating layer comprises polyester.

8. An optical unit as recited in claim 7, wherein said insulating layer is from 5 to 2 micrometers thick and each of said metallic layers is from 5 to 25 micrometers thick.

9. An optical unit as recited in claim 6, wherein said thermally insulating layer comprises polyimide.

10. An optical unit as recited in claim 9, wherein said insulating layer is from 5 to 25 micrometers thick and each of said metallic layers is from 5 to 25 micrometers thick.

* * * * *